United States Patent
Weng et al.

(10) Patent No.: US 7,197,457 B2
(45) Date of Patent: Mar. 27, 2007

(54) METHOD FOR STATISTICAL LANGUAGE MODELING IN SPEECH RECOGNITION

(75) Inventors: Fuliang Weng, Mountain View, CA (US); Badri Raghunathan, San Jose, CA (US); Hauke Schmidt, San Bruno, CA (US)

(73) Assignee: Robert Bosch GmbH, Stuttgart (DE)

( * ) Notice: Subject to any disclaimer, the term of this patent is extended or adjusted under 35 U.S.C. 154(b) by 420 days.

(21) Appl. No.: 10/427,601

(22) Filed: Apr. 30, 2003

(65) Prior Publication Data

US 2004/0220813 A1    Nov. 4, 2004

(51) Int. Cl.
*G10L 15/00*    (2006.01)
(52) U.S. Cl. ..................... 704/255; 704/257
(58) Field of Classification Search ........... 704/255, 704/257
See application file for complete search history.

(56) References Cited

U.S. PATENT DOCUMENTS

| | | | | |
|---|---|---|---|---|
| 6,021,384 | A * | 2/2000 | Gorin et al. ................. | 704/1 |
| 6,167,377 | A * | 12/2000 | Gillick et al. ............... | 704/240 |
| 6,704,710 | B2 * | 3/2004 | Strong ........................ | 704/255 |
| 6,904,402 | B1 * | 6/2005 | Wang et al. ................. | 704/10 |

OTHER PUBLICATIONS

Brown et al., "Class-Based n-gram Models of Natural Language", *Computational Linguistics—18*:4, pp. 467-479.
Hunt et al., "Unit Selection In A Concatenative Speech Synthesis System Using A Large Speech Databae", *Proc. ICASSP-96*, May 7-10, pp. 1-4.
Santorini, "Part-of-Speech Tagging Guidelines for the Penn Treebank Project" (3rd Revision, 2nd printing), Jun. 1990, pp. 1-32.
Weng et al., "Language Modelling for Multilingual Speech Translation", *SLT Book Chaper—Draft Wed Dec 15 13:21:22 PST 1999*, pp. 281-296.
International Search Report for PCT/US04/10992, Date of Mailing Apr. 18, 2006.

* cited by examiner

*Primary Examiner*—Daniel Abebe
(74) *Attorney, Agent, or Firm*—Kenyon & Kenyon

(57) ABSTRACT

A system for generating language modeling data for a speech recognition system includes an expression extractor to extract expression from domain-specific data of an existing domain using a base of linguistic knowledge, a concept structure mapper to map extracted expression to expression in a new domain using vocabulary for the new domain, a concatenation module to concatenate extracted expression with domain-general data, and a filter arrangement to identify and filter out unrealistic expression in the mapped or concatenated expression.

29 Claims, 15 Drawing Sheets

|  | Existing Domain (A) | New Domain (B) |
|---|---|---|
| TAG to TAG | AIRPORT | POINT-OF-INTEREST |
|  | AIRLINES | ROUTES |
|  | SERVICES | POINT-OF-INTEREST |
| Noun to Noun | flight | route, trip |
|  | flight number | route id, road-name |
|  | carrier | transport |
| Verb to TAG | departing | DEPART |
|  | depart | DEPART |
|  | flying | MOVE |
|  | land | ARRIVE |
|  | run | MOVE |
|  | takeoff | DEPART |
| Verb to TAG | DEPART | leave |
|  | MOVE | go, drive, rush |
|  | ARRIVE | arrive |

METHOD FOR STATISTICAL LANGUAGE MODELING IN SPEECH RECOGNITION

FIELD OF THE INVENTION

The present invention relates to a method for statistical language modeling in speech recognition.

BACKGROUND INFORMATION

Speech recognition may be defined as the process of converting a spoken waveform into a textual string of words, such as, for example, a sentence expressed in the English language.

The process of speech recognition may be classified into three major phases: a front-end phase, an acoustic modeling phase, and a language modeling phase. In the front-end phase, "raw" speech signals are spectrally analyzed for salient features and converted into a sequence of digitally encoded feature vectors. In the acoustic modeling phase, the sequence of feature vectors is examined to extract phone sequences (e.g., simple vowel or consonant sounds) using knowledge about acoustic environments, gender and dialect differences, and phonetics. In the language modeling phase, the phone sequences are converted into corresponding word sequences using knowledge of what constitutes a possible word, what words are likely to occur, and in what sequence.

Despite recent advances, it is believed speech recognition systems have not reached the level of sophistication possessed by humans. In particular, the complexity and intricacies of language combined with varied acoustic environments pose significant challenges to realizing a truly human-like speech recognition system. For example, a speech recognition system must contend with lexical and grammatical complexity and variations of spoken language as well as the acoustic uncertainties of different accents and speaking styles. Therefore, to reduce the complexity and limit the uncertainties speech recognition systems may be built on a small scale for specific domain applications, such as, for example, an airline flight/travel information system (ATIS) or telephone directory information system.

To construct a high quality speech recognition system, a large amount of domain data with a variety of linguistic phenomena may be required to guide the system's interpretation of speech and allow it to determine the appropriate action. For example, it is believed that a speech recognition system supporting a medium-sized application-specific domain of approximately 2,000 words may require 20,000 "in-domain" sentences to be collected to construct a proper language training model. The data collection for such a system may be tedious, time consuming, expensive, and may neglect important aspects of speech, such as a speaking style or idiomatic usages. Furthermore, if the number of in-domain sentences collected were less than the required amount, then a "data sparseness" issue may arise wherein the system lacks enough data to sufficiently cover all the varieties of possible expressions used in that particular domain. Hence, training a speech recognition system to support a new application domain may require a significant amount of time and effort due to the amount of data that may need to be collected.

Various techniques may exist to synthesize data for speech dialog systems. As referred to in Hunt, A., and Black, A. "Unit Selection in a concatenative speech synthesis system using a large speech database" Proc of ICASSP-96 (1996), Atlanta, Ga., speech may be synthesized by first setting up a target specification where a string of phonemes required to synthesize the speech together with prosodic features is defined, and then selecting suitable phonetic units from a database for concatenation. As referred to in Weng, F. L., Stolcke, A., and Cohen, M. "Language Modeling for Multilingual Speech Translation" printed in M. Rayner et al. (eds.) *Spoken Language Translator* Cambridge University Press (2000) 281, a pre-existing grammar may be used to generate phrase chunks (i.e., a complete or partial speech utterance) which may then be interpolated with a small amount of in-domain data, e.g., a few thousand sentences. As referred to in Brown, P. F. et al. "Class-Based n-gram Models of Natural Language" Association for Computational Linguistics 18(4) (1992) pp. 467–479, the problem of predicting a word from previous words in a sample of text may be addressed via n-gram models based on classes of words. The n-gram models may utilize statistical algorithms to assign words to classes based on the frequency of their co-occurrence with other words. The word classes may be used in language modeling to provide a wide range of applications, such as speech recognition or grammar correction. Generating data for new domains was not believed to be readily obtainable via this approach because a low-order n-gram may not contain enough long distance information and a high-order n-gram model may require a large amount of training data that may not be available and/or feasible.

SUMMARY OF THE INVENTION

The exemplary embodiment and/or exemplary method of the present invention may reduce or eliminate the data collection requirements of a speech recognition system by constructing the new domain data using existing domain data, linguistic knowledge, and statistical techniques. It is believed that a significant amount of linguistic phenomena in human dialog may be transferred from one speech application domain to another so that data developed for one speech application domain may be adapted into data for another speech application domain with minimal or less effort. In this regard, the present invention may use a number of generally available sources to generate the new data, such as, for example, the switchboard data in Penn Treebank by the Linguistic Data Consortium (LDC) at the University of Pennsylvania, or an online lexical reference system, such as, for example, WordNet.

In contrast to other data collection techniques, an exemplary method of the present invention may not require a pre-existing domain-specific grammar to generate data for the new domain since many of the grammatical constraints associated with the new domain are believed to be inherent in the existing domain. Hence, only the vocabulary for the new domain may be required. In this regard, the domain-specific data of the existing domain may be a reasonable size, such as, for example, 20,000 sentences, so that it may be used as a starting basis to generate the data for the new domain.

An exemplary embodiment and/or exemplary method of the present invention may also use linguistic and statistical measures to synthesize data, including, for example, linguistic and statistical measures which operate at a word level to produce a set of sentences for the new domain. In this regard, a target specification may not be required except the vocabulary for the new domain and a concept mapping table.

An exemplary embodiment and/or exemplary method of the present invention may also rely on statistical relationships between neighboring words or phrases including, for example, the use of linguistic invariants together with local and global collocation statistics to provide both a local and global naturalness in the synthesized data.

An exemplary embodiment and/or exemplary method of the present invention may generate data for a variety of application domains, including, for example, automotive navigation systems, hotel and restaurant information systems, hand-held devices, and mobile telephones. An exemplary embodiment and/or exemplary method of the present invention may also reduce the amount of time to add the new applications to spoken language dialogs systems so that new users may benefit from spoken language dialog systems, whether they are driving, walking, flying, etc.

An exemplary embodiment of the present invention is directed to a system for generating language modeling data for a speech recognition system having an expression extractor to extract expression from domain-specific data of an existing domain using a base of linguistic knowledge, a concept structure mapper to map extracted expression to expression in a new domain using vocabulary for the new domain, a concatenation module to concatenate extracted expression with domain-general data, and a filter arrangement to identify and filter out unrealistic expression in at least one of mapped and concatenated expression.

Yet another exemplary embodiment of the present invention is directed to the system, in which the system is configured to generate the language modeling data without a pre-existing domain-specific grammar.

Still another exemplary embodiment of the present invention is directed to the system, in which the extracted expression includes a domain-invariant expression.

Yet another exemplary embodiment of the present invention is directed to the system, in which the extracted expression includes at least one of an idiomatic, a temporal, a spatial, and a monetary expression.

Still another exemplary embodiment of the present invention is directed to the system, in which the extracted expression includes combined temporal and spatial expression.

Yet another exemplary embodiment of the present invention is directed to the system, in which the base of linguistic knowledge includes a lexical reference source.

Still another exemplary embodiment of the present invention is directed to the system, in which the lexical reference source includes a dictionary.

Yet another exemplary embodiment of the present invention is directed to the system, in which the dictionary includes an electronic dictionary.

Still another exemplary embodiment of the present invention is directed to the system, in which the electronic dictionary is available via a data network.

Yet another exemplary embodiment of the present invention is directed to the system, in which the data network includes an Internet.

Still another exemplary embodiment of the present invention is directed to the system, in which the concept structure mapper includes a domain-specific word-pair mapping table to correlate at least one word in the existing domain with at least one word in the new domain.

An exemplary method of the present invention is directed to generating language modeling data for a speech recognition system, including extracting expression from domain-specific data for an existing domain using a base of linguistic knowledge, mapping an extracted expression to a expression in a new domain using vocabulary for the new domain, concatenating the extracted expression using domain-general data, and filtering at least one of the mapped and concatenated expression.

Yet another exemplary method of the present invention is directed to generating language modeling data in which the step of mapping the extracted expression includes establishing a domain-specific word-pair mapping table to identify and correlate at least one word in the existing domain with at least one word in the new domain.

Still another exemplary method of the present invention is directed to generating language modeling data in which the step of mapping the extracted expression includes performing a neighboring word collocation verification test on the mapped expression to verify a naturalness of the mapped expression.

Yet another exemplary method of the present invention is directed to generating language modeling data in which the step of concatenating includes performing a statistical collocation measurement of the concatenated expression to ensure a smoothness of at least one of neighboring words and neighboring phrases and chaining highly-collocated pairs to form candidate sentences for the new domain.

Still another exemplary method of the present invention is directed to generating language modeling data in which the step of filtering includes performing an additional statistical collocation measurement of the candidate sentences and removing candidate sentences having a collocation value below a predefined value.

Yet another exemplary method of the present invention is directed to generating language modeling data in which the new domain includes at least one of a navigation system, a hotel information system, and a restaurant information system.

Still another exemplary method of the present invention is directed to generating language modeling data in which the navigation system includes an automotive navigation system.

Yet another exemplary method of the present invention is directed to generating language modeling data in which the navigation system includes a hand-held device.

Still another exemplary method of the present invention is directed to generating language modeling data in which the hand-held device includes a mobile telephone.

An exemplary embodiment and/or exemplary method of the present invention is directed to a storage medium having a set of instructions residing therein, the set of instructions being executable by a processor to implement a method for performing a sequence including extracting expression from domain-specific data for an existing domain using a base of linguistic knowledge, mapping an extracted expression to a expression in a new domain using vocabulary for the new domain, concatenating the extracted expression using domain-general data, and filtering at least one of the mapped and concatenated expression.

BRIEF DESCRIPTION OF THE DRAWINGS

FIG. 11 shows an exemplary table of alternative expression pairs to assist in mapping expressions of an airline traffic information system (ATIS) to an automotive navigation system.

DETAILED DESCRIPTION

An exemplary embodiment of the present invention may include a computer, microprocessor, or other suitable processing arrangement used to implement or perform the method described herein.

Figure 1:
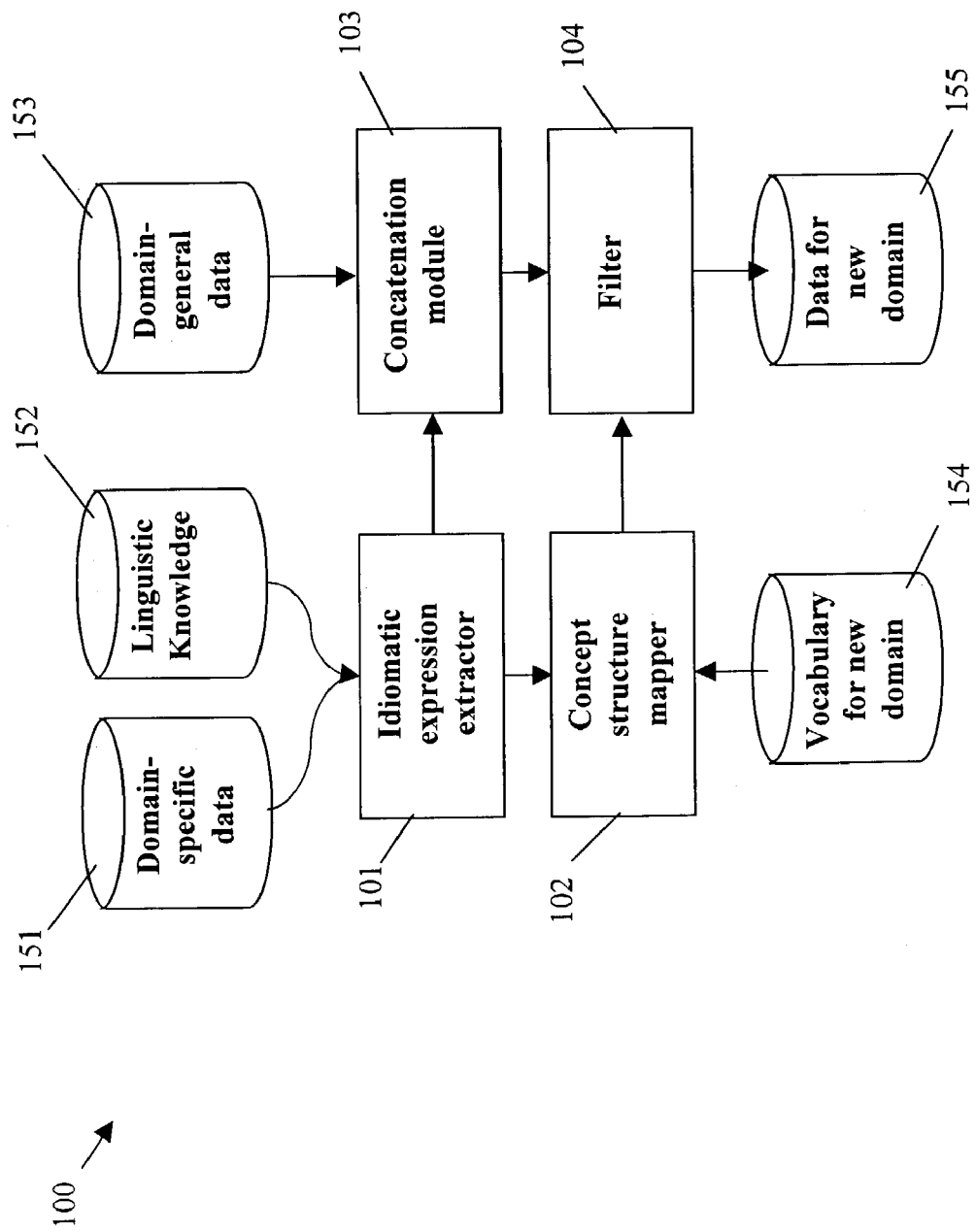
FIG. 1 shows an exemplary system for adapting a set of data developed for one application domain for use in a new application domain using a base of linguistic knowledge and vocabulary for the new domain.

FIG. 1 shows an exemplary system 100 for adapting a set of data developed for one application domain for use in a new application domain using a base of linguistic knowledge and vocabulary for the new domain. The exemplary system 100 includes an idiomatic expression extractor 101, a concept structure mapper 102, a concatenation module 103, and a filter arrangement 104. The idiomatic expression extractor 101 uses domain specific data 151 from the existing domain and linguistic knowledge 152 from generally available dictionaries and other sources to produce expressions with a conversational style. The concept structure mapper 102 uses vocabulary from the new domain 154 to establish a mapping of domain-specific expressions between the existing domain and the new domain. The concatenation module 103 uses domain-general data 153 and extracted expression to generate expression for the new domain 155. The filtering arrangement 104 removes unrealistic expression.

Figure 2:
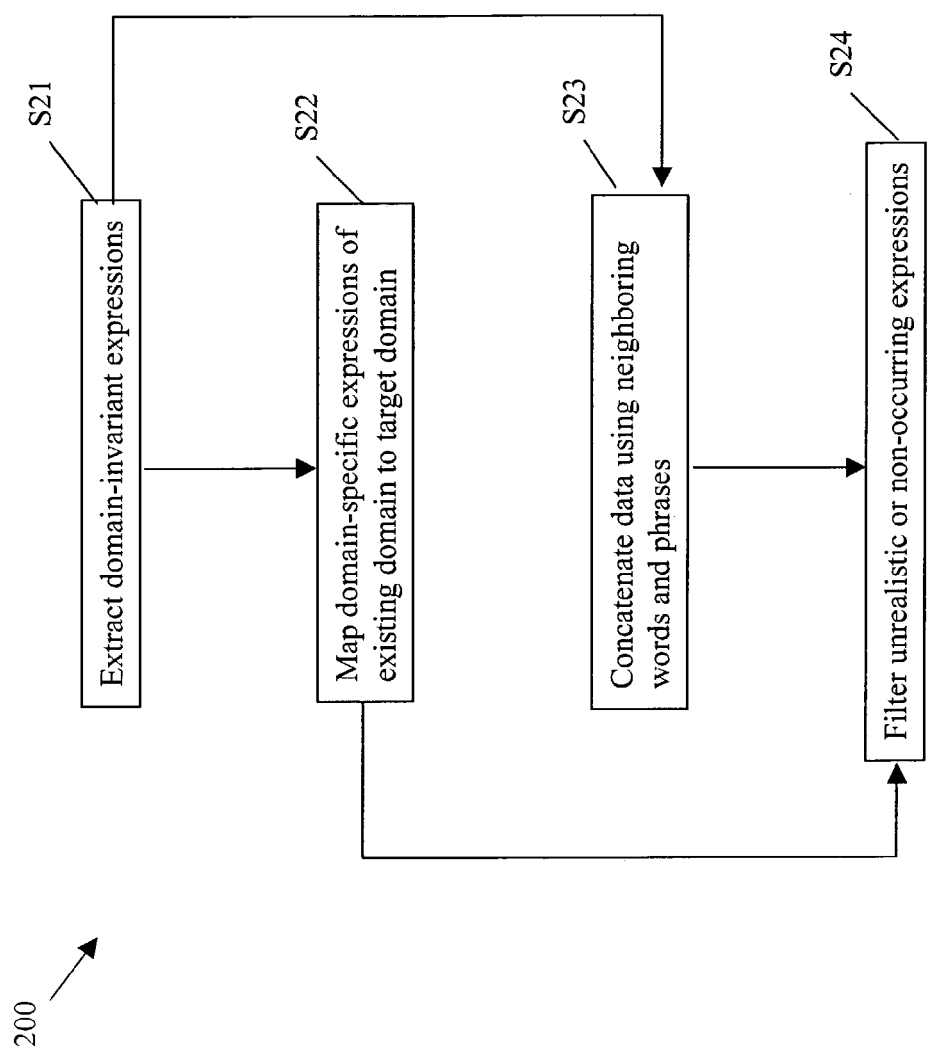
FIG. 2 shows an exemplary method for adapting a set of data developed for one application domain for use in a new application domain.

FIG. 2 shows an exemplary method 100 for adapting a set of data developed for one application domain for use in new application domain. Exemplary method 100 includes an extraction stage S21, a concept mapping stage S22 and/or a concatenation stage S23, and a filtering stage S24. In the extraction stage S21, linguistic expressions with a conversational style are extracted using a base of linguistic knowledge to obtain domain-invariant expressions. In the concept mapping stage S22, new structures in the target domain are acquired. In the concatenation stage S23, new sentence patterns in the target domain are pieced together from the available data sources. In the filtering stage S24, combinations of expression that are deemed inappropriate or undesirable are removed from the new domain. Each of the stages S21–S24 is more fully described below.

In the extraction stage S21, linguistic expressions with a conversational style are extracted from an existing domain-specific set of data using a base of linguistic knowledge, such as the Longman Dictionary of Contemporary English (LDOCE) published by Longman Publishing Corp. or WordNet—an open resource provided by Professor George Miller and his associates at Princeton University (see the Princeton University Website under the Congitive Science group). In particular, three types of expressions may be extracted: idiomatic, temporal, and/or spatial expressions. Idiomatic expressions are those expressions which are peculiar or characteristic of a particular language and may include, for example, sentence-initial expressions (e.g., "I would like to" or "Please tell me"), sentence-ending expressions (e.g., "You got it right?" or "Is it ok?"), and discourse marks (e.g., "Now" or "But"). Temporal expressions are those that convey an aspect of time such as a calendar date or the time of the day (e.g., "Monday, Jan. 14, 2003" or "till 3:00 o'clock in the afternoon"). Spatial expressions are those that pertain to an aspect of spacial dimension such as a reference to a geographic location or position (e.g., "in Palo Alto, Calif."). The temporal and spatial types of expressions may be extracted together in that the extraction target is the combination of the two types so that a more natural extracted expression may be achieved.

Idiomatic, temporal, and spatial expressions tend to be domain-invariant—that is, not specific to a particular application domain but may be found in any domain. Therefore, once extracted, the idiomatic, temporal, and spatial expressions may serve as base units for sentence synthesis or concatenation. In addition to idiomatic, temporal, and spatial, other domain-invariant expressions may be extracted as well, such as, for example, monetary expressions and proper names for people and organizations.

In the concept mapping stage S22, domain-specific expressions of an existing application domain are mapped to corresponding words in the new application domain. In particular, a domain-specific word-pair mapping table may be established to identify and correlate one or more words in the existing domain which convey a similar concept as one or more corresponding words in the new domain. For example, the word "fly" for an Air Travel Information System (ATIS) application domain may convey a similar concept as the word "drive" for an Automotive Navigation System application domain, or the word "scan" for a Television Program Guide application domain may convey a similar concept as the word "look up" for a Telephone Directory Assistance application domain.

The domain-specific word-pair mapping table may contain mappings for numerous "head" words, that is, key nouns, verbs, or other parts-of-speech, which are extracted from the existing domain along with their corresponding argument structures from generally available dictionaries, such as the Longman Dictionary of Contemporary English or WordNet.

The concept mapping stage S22 may further include a neighboring word collocation verification test, such as, for example, a mutual information test, a likelihood ratio test, or a $\chi^2$-test, which measure how often two words occur together as a pair in normal everyday speech. Such tests generate word collocation statistical measurements that may be used to verify the "naturalness" of the generated data. In particular, a high collocation statistical measurement indicates that the pairs are often used together in "real-life" speech while a low collocation statistical measurement indicates that the pairs are infrequently or never used together. Accordingly, the mapping is deemed successful only if a certain statistical measurement is achieved for the verification.

In deciding if a particular word pair is natural, the neighboring word collocation verification test may determine how often the two words occur together as compared to other word pairs having only one or neither of the two words. For example, if it were desired to know if a particular word pair, say (w1, w2), were natural in a particular data set, a statistical measurement may be performed for the following four possible occurrence scenarios: (w1, w2), (w1, ~w2), (~w1, w2), and (~w1, ~w2), wherein (w1, w2) represents an occurrence of the words together as a pair, (w1, ~w2) represents an occurrence of w1 with any word that is not w2, (~w1, w2) represents an occurrence of any word that is not w1 with w2, and (~w1, ~w2) represents an occurrence of any word that is not w1 with any word that is not w2. Once the statistics for the four possible occurrence scenarios have been generated, a resulting $\chi^2$ score is compared to a certain threshold. If the $\chi^2$ score is higher than the threshold then word pair (w1, w2) is considered to be natural, otherwise the word pair (w1, w2) is considered to be unnatural.

As an alternative to or in addition to the concept mapping stage S22, a concatenation stage S23 make take place to ensure a proper "smoothness" of the extracted expression. The concatenation stage may be implemented in two levels, including a local level concatenation and a global level concatenation. At the local level, statistical collocation measures are used to ensure a smoothness of each pair of neighboring words/phrases. At the global level, valid pairs are chained together to form candidate sentences.

When measuring the smoothness of two phrases, corresponding phrase heads are used in the collocation. To identify the phrase heads, a keyword spotting technique may be used. Keyword spotting techniques use cues to identify whether a phrase belongs to a particular semantic category, as well as which word is the head for that phrase. For example, the word "street" may be a cue for the semantic category of street name phrases as well as the head word for the street name phrase (e.g., Main Street), the word "city" may be a cue to the semantic category of city name phrases as well as the head for the city name phrase (e.g., New York City), and the word "to" may be a cue for the semantic category of a destination phrases.

The neighboring word pair statistics may be obtained from non domain-specific data, such as, for example, the Wall Street Journal in Penn Treebank data set, and may be considered as domain independent. This may be similarly true for the head pair statistics.

In the filtering stage S24, the unrealistic expressions or expression combinations that may be considered unlikely to occur in the new domain may be filtered out to ensure that the obtained data is not over-generated. Unrealistic patterns may be specified by a native speaker or through an automatic procedure. In the automatic procedure, a sentence of words is converted into a sequence of semantic categories, a by-product in the first two stages. Given the main action or verb, and the sequence of semantic categories, the frequency of the occurrence in any general corpora may be measured.

Figure 3:
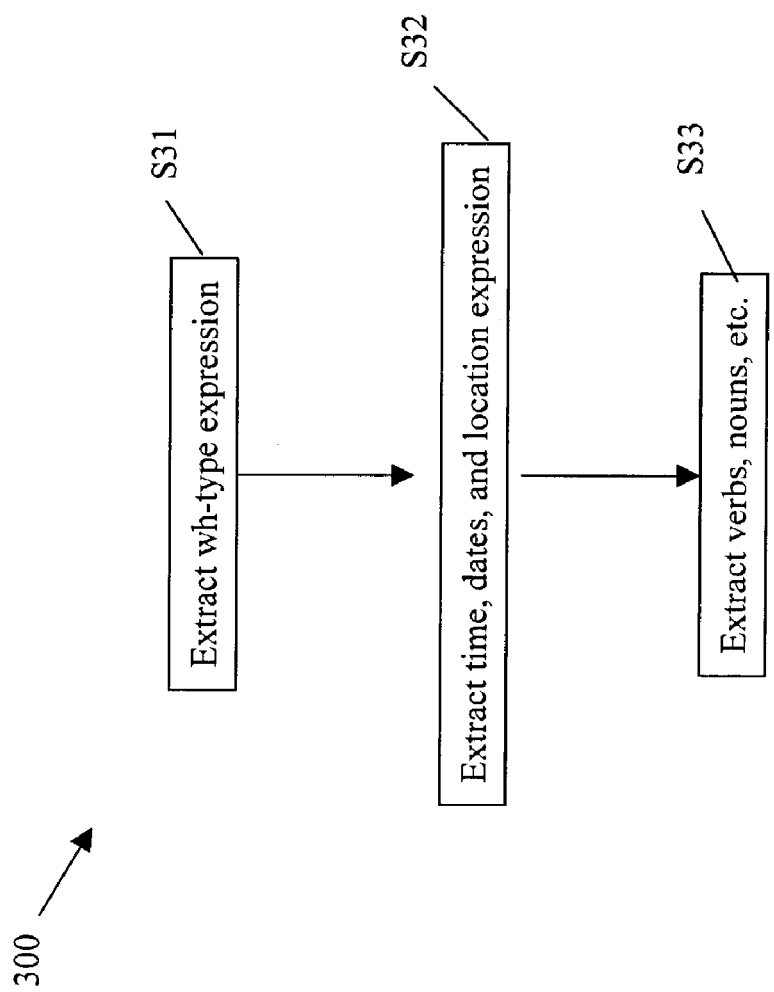
FIG. 3 shows an exemplary method for extracting expression.

FIG. 3 shows an exemplary method 300 for extracting expression. In step S31, wh-type expressions are extracted, including, for example, expressions such as "who", "what", "where", "when", "why", "which", "one of which", and "whatever". In step S32, time, date, and location expressions are extracted. In particular, only time, date, and location expression which is "continuous" or "pure" (that is, not inclusive of other types of expression) is extracted. In step S33, verbs, nouns, adjectives, adverbs, determiners, and other open set elements are extracted via, for example, a commercially available tagging application.

Figure 4:
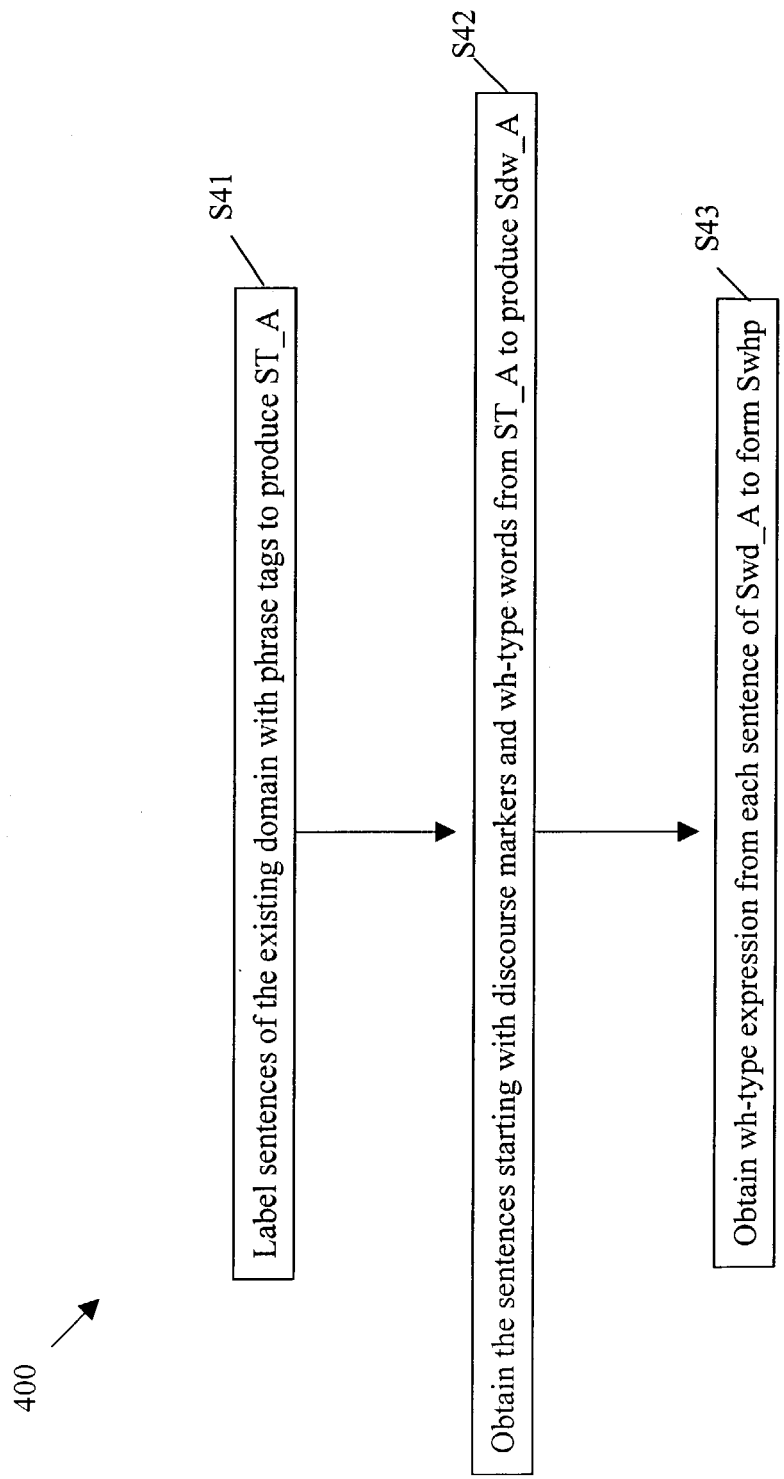
FIG. 4 shows an exemplary method for extracting wh-type expression.

FIG. 4 shows an exemplary method 400 for extracting wh-type expression. In step S41, sentences of the existing domain (A) are labeled with phrase tags to form a set of tagged sentences of the existing domain (ST_A). In step S42, the set of tagged sentences (ST_A) is searched for sentences starting with discourse markers and inclusive of wh-type words to form a subset of tagged sentences of the existing domain having discourse markers and wh-type words (Sdw_A). In step S43, wh-type expression is obtained from each sentence of the subset of tagged sentences of the existing domain having discourse markers and wh-type words (Swd_A) to form a set of wh-type phrases (Swhp).

Figure 5:
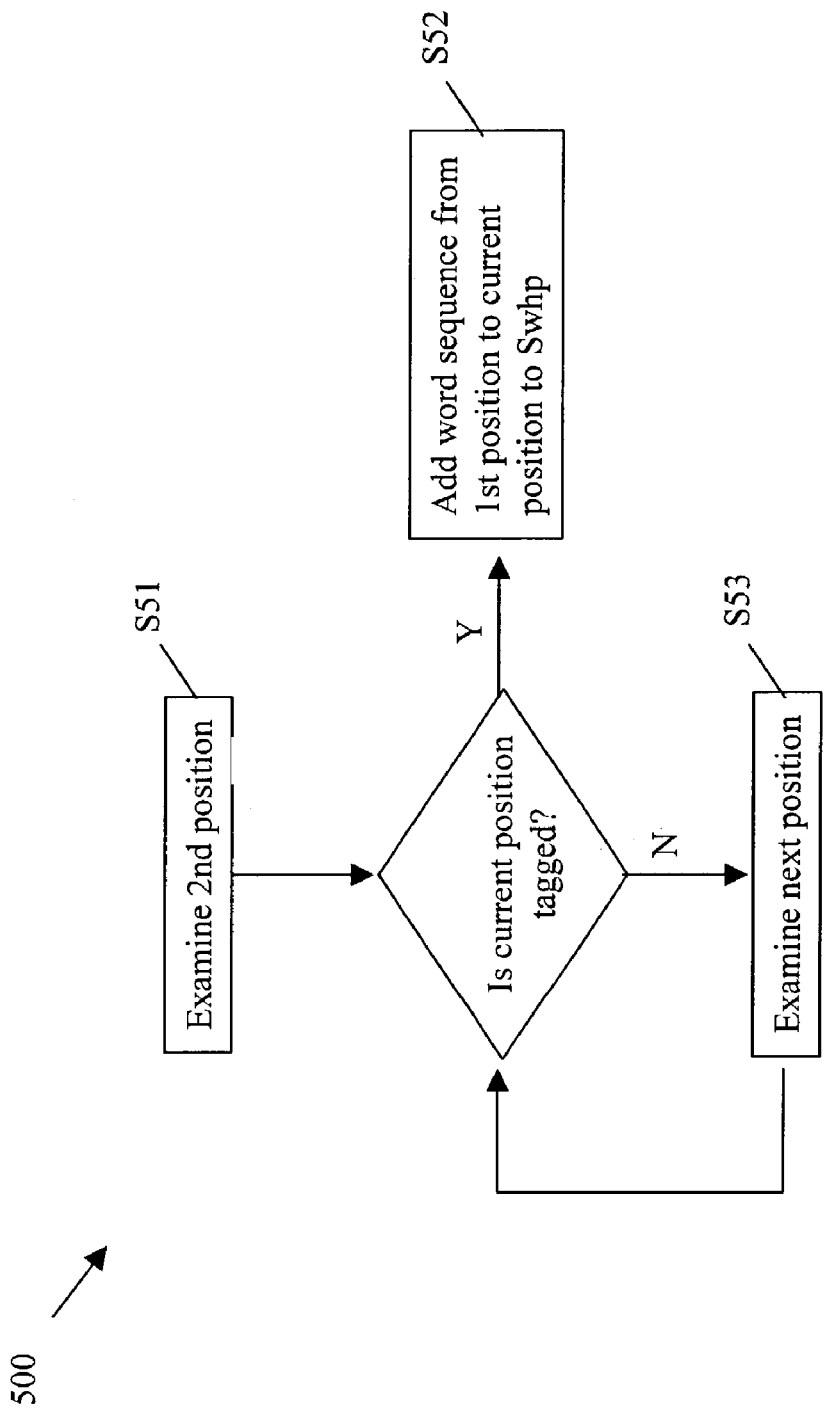
FIG. 5 shows an exemplary method for extracting wh-type expression from a subset of tagged sentences.

FIG. 5 shows an exemplary method 500 for obtaining wh-type expression from each sentence of the subset of tagged sentences of the existing domain having discourse markers and wh-type words (Sdw_A). In step S51, the word at the second position of the current tagged sentence is examined to see if it is tagged indicating, for example, that the word belongs to a particular set of tagged words such as a set of prepositions, conjunctions, or determiners, etc. If the word at the current position is tagged, then in step S52 the word sequence starting from the first position to the current position is added to the set of wh-type phrases (Swhp), otherwise in step S53 the next position is examined. The exemplary method 500 is performed for each sentence in the subset of tagged sentences of the existing domain having discourse markers and wh-type words (Sdw_A).

Figure 6:
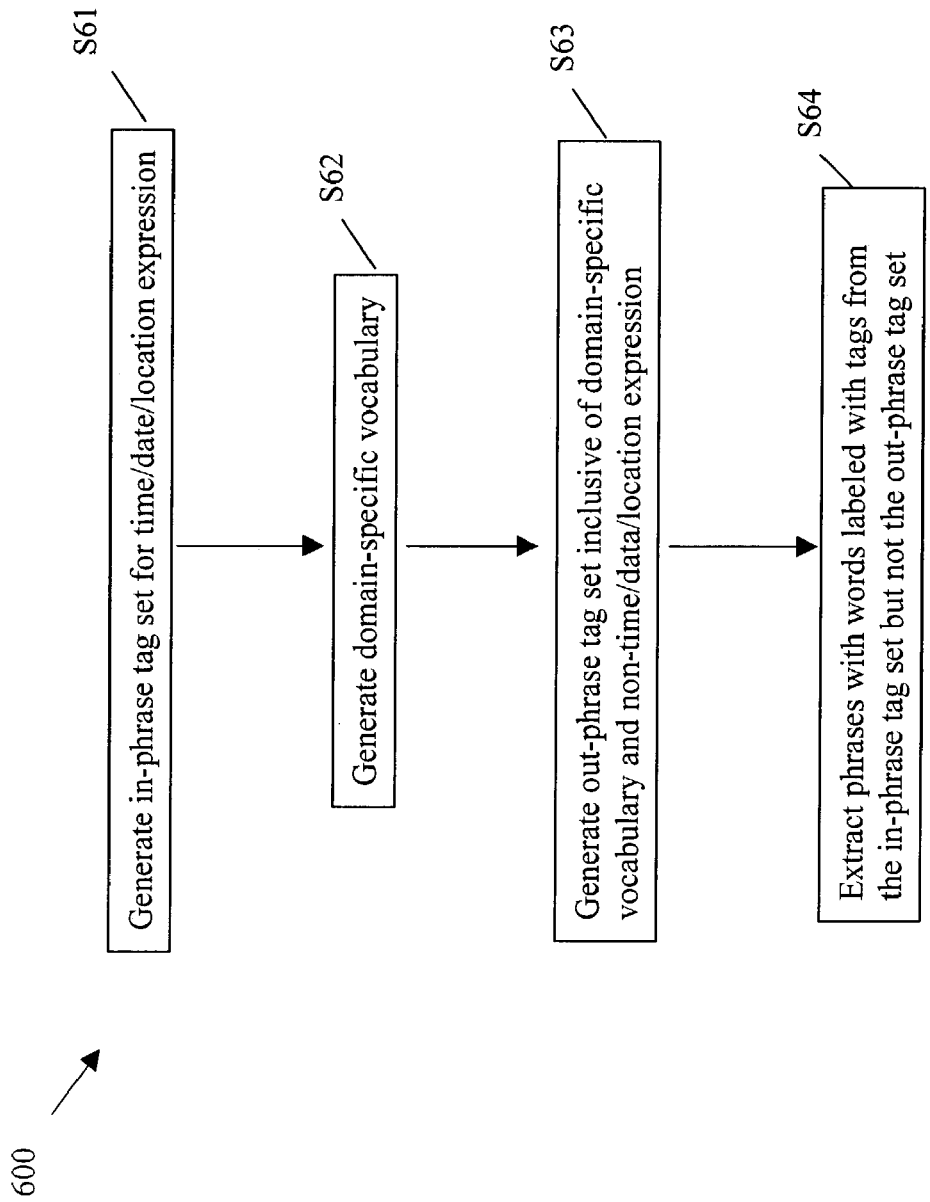
FIG. 6 shows an exemplary method for extracting continuous expression for time, dates, and location.

FIG. 6 shows an exemplary method 600 for extracting a continuous expression for time, date, and location. In step S61, the set of words and tags pertinent to constructing a time, date, and/or location phrase is determined and collectively identified as the "in-phase" tag set. These words may include, for example, an expression of localized time, a period of days or nights, a calendar date, a weekday, a month, a lunar cycle, a geographic location or place, or any combination thereof, as well as prepositions and/or conjunctions to connect such words. In step S62, an application domain-specific vocabulary is generated via, for example, application specific nouns, pronouns, verbs, auxiliary verbs, etc., or any combination thereof. In step S63, the set of words and tags which may be considered not usually pertinent to expressing time, date, and location is determined and collectively identified as the "out-phrase" set. In step S64, phrases with words labeled with tags from the in-phrase tag set, but not from the out-phrase tag set, are extracted.

Figure 7:
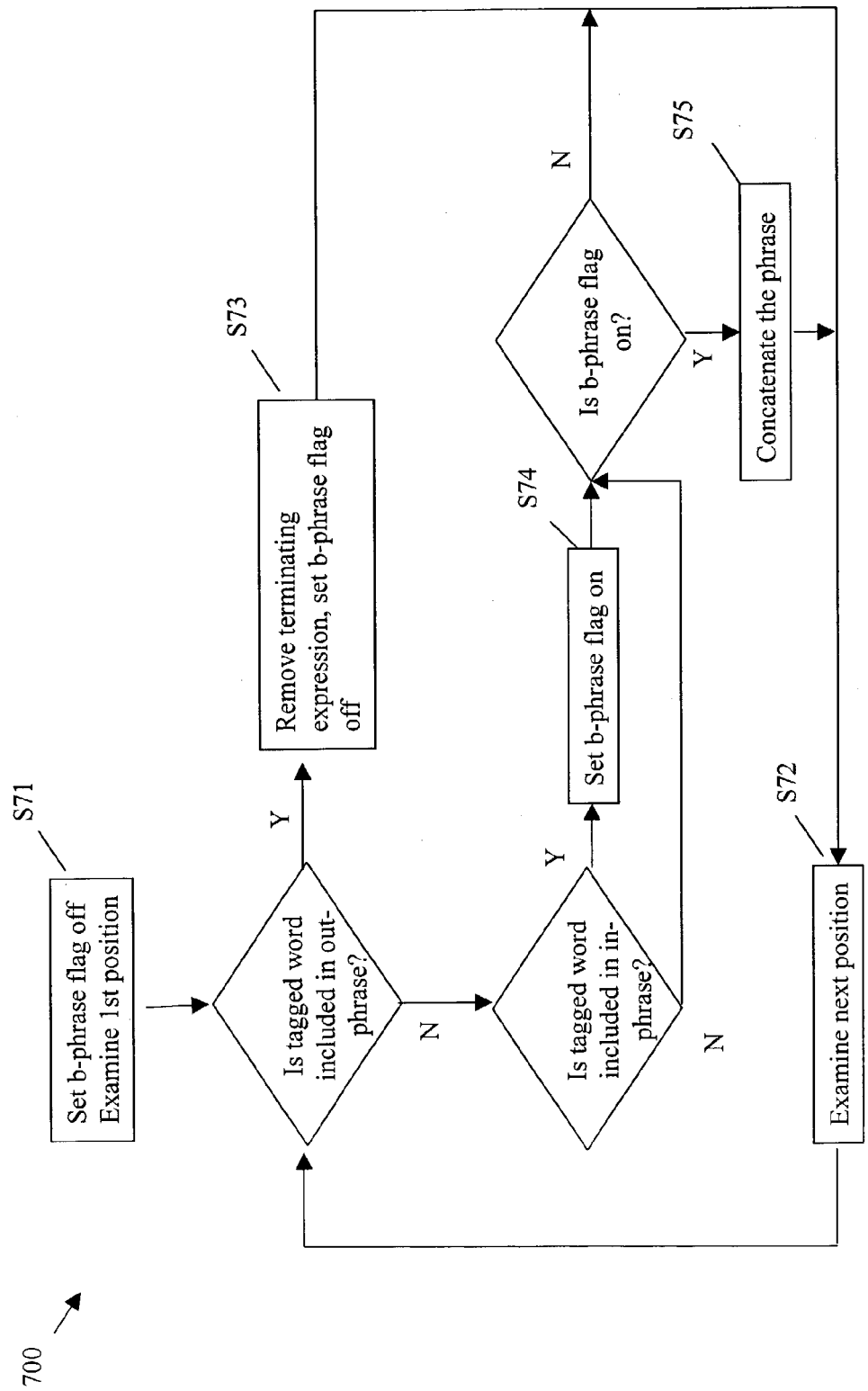
FIG. 7 shows an exemplary method for extracting phrases with words labeled with tags from an in-phrase defined tag set but not from an out-phrase defined tag set.

FIG. 7 shows an exemplary method 700 for extracting phrases with words labeled with tags from the in-phrase tag set, but not the out-phrase tag set. In steps S71 and S72, the b-phrase is set to off and the words of a sentence are examined sequentially from the first position to the last position. If the currently examined word is labeled with a tag in the out-phrase tag set, then in step S73 terminating expression is removed, otherwise if the currently examined word is labeled with a tag in the in-phrase tag set, then in step S74 the b-phrase flag is set to on, otherwise if the b-phrase flag is on, then in step S75 the phrase is concatenated.

Figure 8:
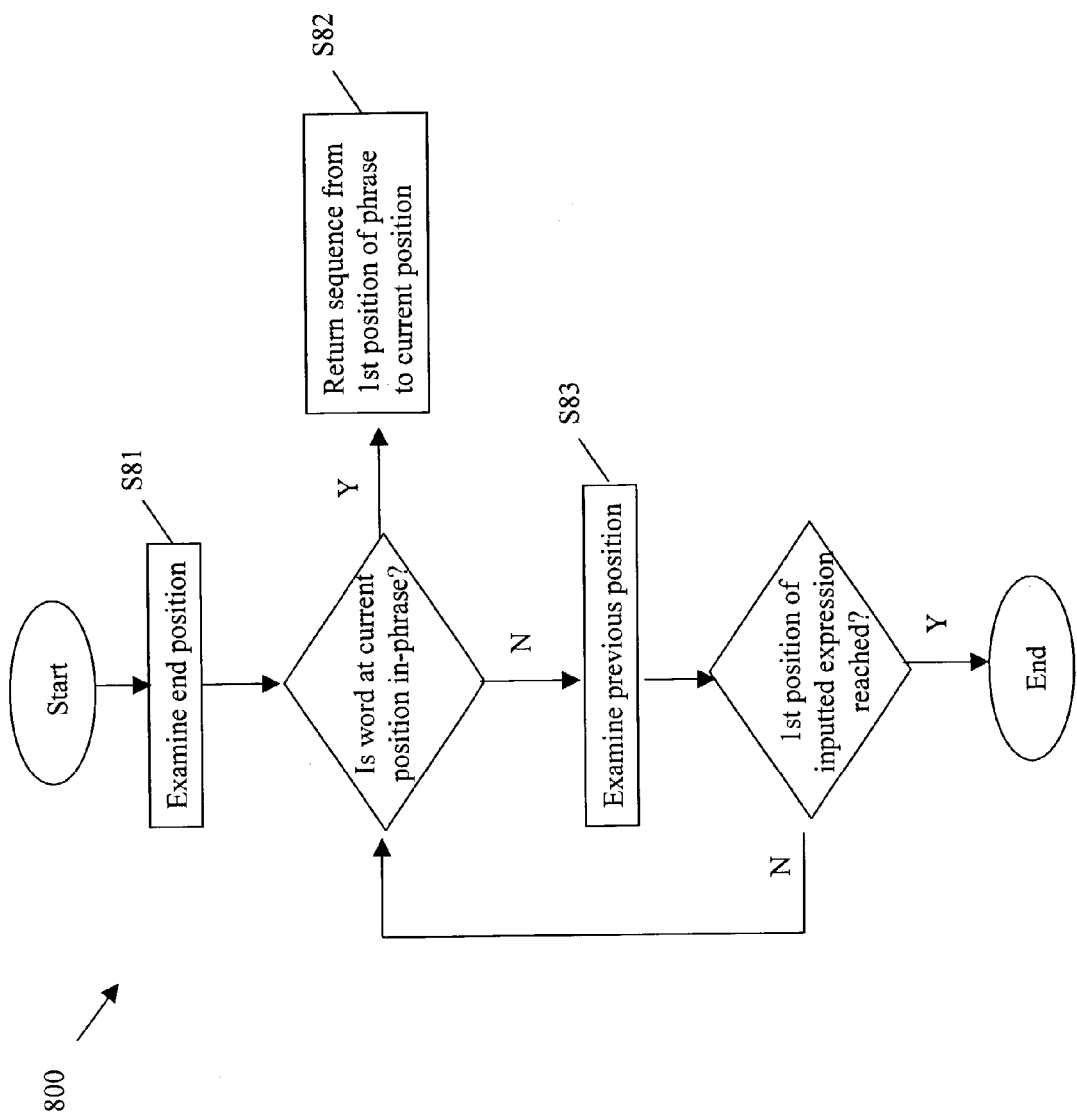
FIG. 8 shows an exemplary method for extracting phrases.

FIG. 8 shows an exemplary method 800 for extracting phrase expression. In steps S81 and S83, the inputted expression is sequentially examined in reverse order starting from the end position to the first position for a word that is included in the set of in-phrase expression. If a word is found to be in the set of in-phrase expression, then in step S82, the sequence of words starting from the first word to the current word is returned.

Figure 9:
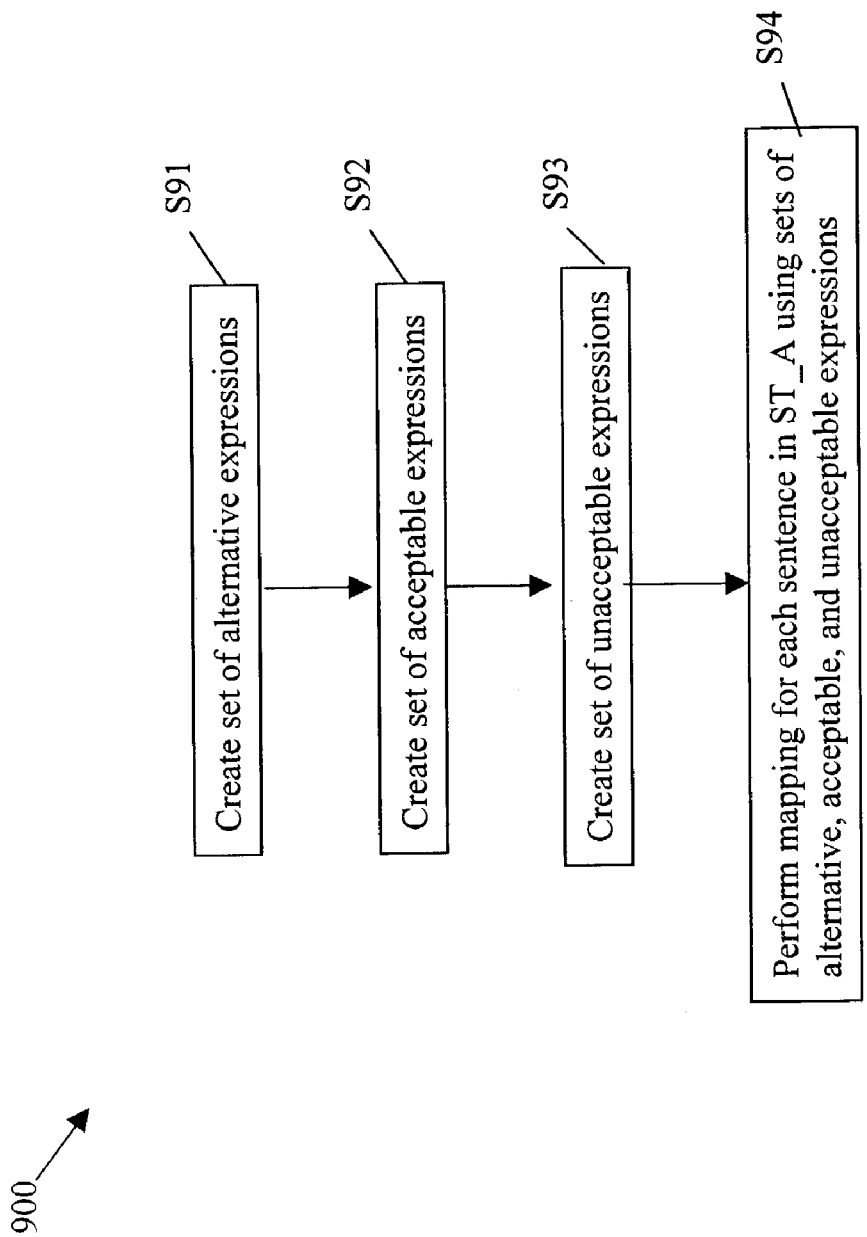
FIG. 9 shows an exemplary method for mapping expression from an existing domain to corresponding expression in a new domain.

FIG. 9 shows an exemplary method 900 for mapping expression from an existing domain to corresponding expression in the new domain. In step S91, a set of expressions present in the existing domain that correspond to alternative or replaceable expressions present in new domain is created. In step S92, a set of expressions present in the existing domain that correspond to acceptable expressions that are present in new domain is created. In step S93, a set of expressions never present in new domain is created. In step S94, a mapping of expression from the existing domain to new domain is performed using the above-described three newly-sets of alternative, acceptable, and unacceptable expression and the set of tagged sentences of the existing domain (ST_A).

Figure 10:
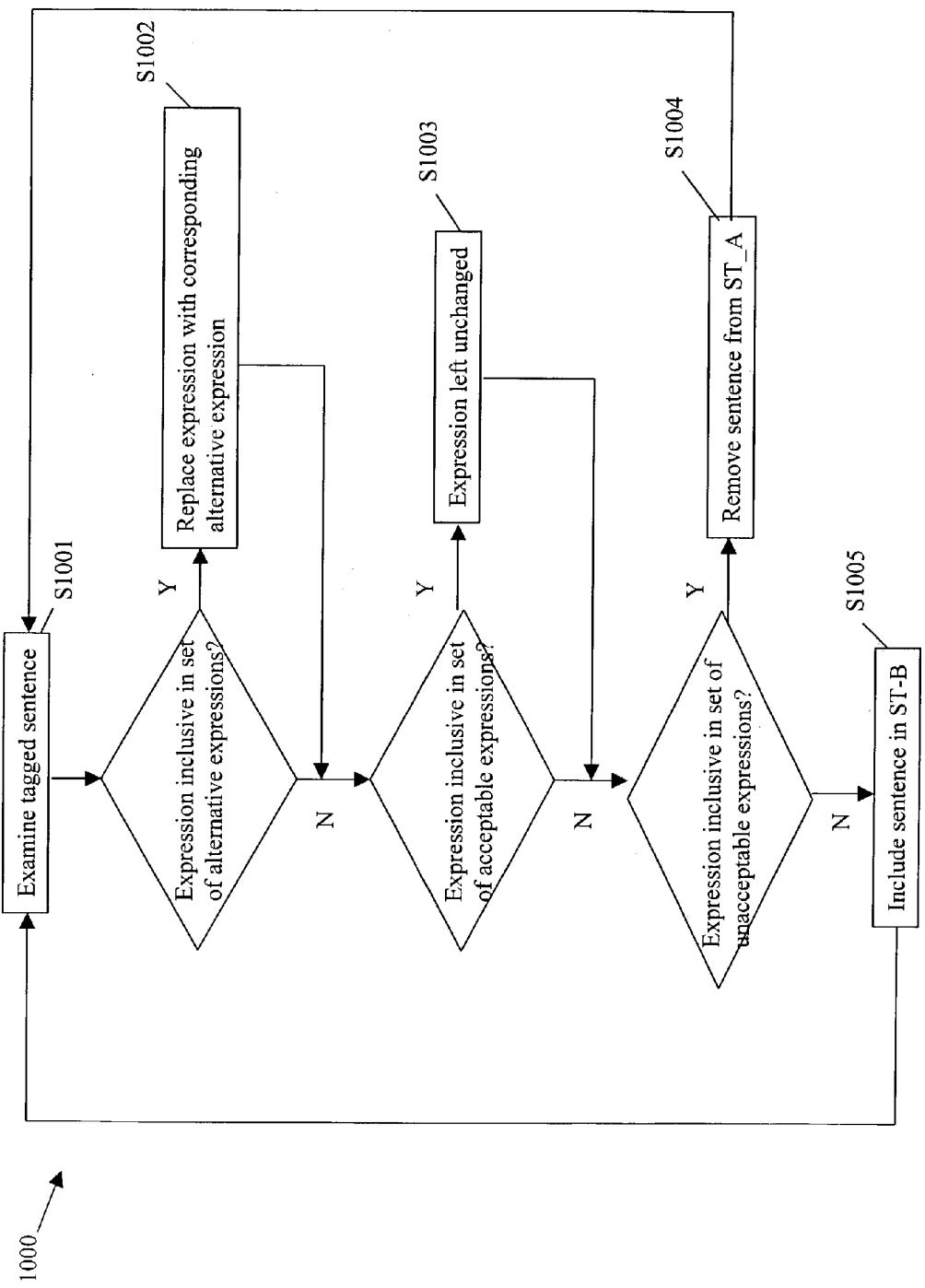
FIG. 10 shows an exemplary method for mapping expression from an existing domain to a new domain using sets of alternative, acceptable, and unacceptable expression.

FIG. 10 shows an exemplary method 1000 for mapping expression from the existing domain to a new domain using the above-described three newly-created sets of alternative, acceptable, and unacceptable expressions and the set of tagged sentences of the existing domain (ST_A). In step S1001, a tagged sentence is examined for expression inclusive in of the above-described three newly created sets of alternative, acceptable, and unacceptable expression. If an expression is found to be inclusive in the set of alternative expressions, then in step S1002 the expression is replaced with the alternative expression. If an expression is found to be inclusive in the set of acceptable expressions, then in step S1003, the expression is left unchanged. If the expression is found to be inclusive in the set of unacceptable expressions then the sentence is removed, otherwise in step S1004, the sentence is included in the set of tagged sentences of the new domain (ST_B). The exemplary method 1000 is performed for each sentence in the set of tagged sentences of the existing domain (ST_A).

FIG. 11 shows an exemplary table 1100 of alternative expression pairs to assist in mapping expressions of an airline traffic information system (ATIS) application domain to expressions an automotive navigation system application domain. Uppercase entries represent phrase tags and lowercase entries represent actual words of expression.

Figure 12:
FIG. 12 shows an exemplary table of acceptable expressions for translation from an air traffic information system (ATIS) and an automotive navigation system.

FIG. 12 shows an exemplary table 1200 of expressions that are acceptable for direct translation from an air traffic information system (ATIS) application domain to an automotive navigation system application domain. The type of expressions acceptable for direct translation include, for example, location, date, time, money, wh-type, preposition, conjunction, auxiliary verb, and determiner expressions.

Figure 13:
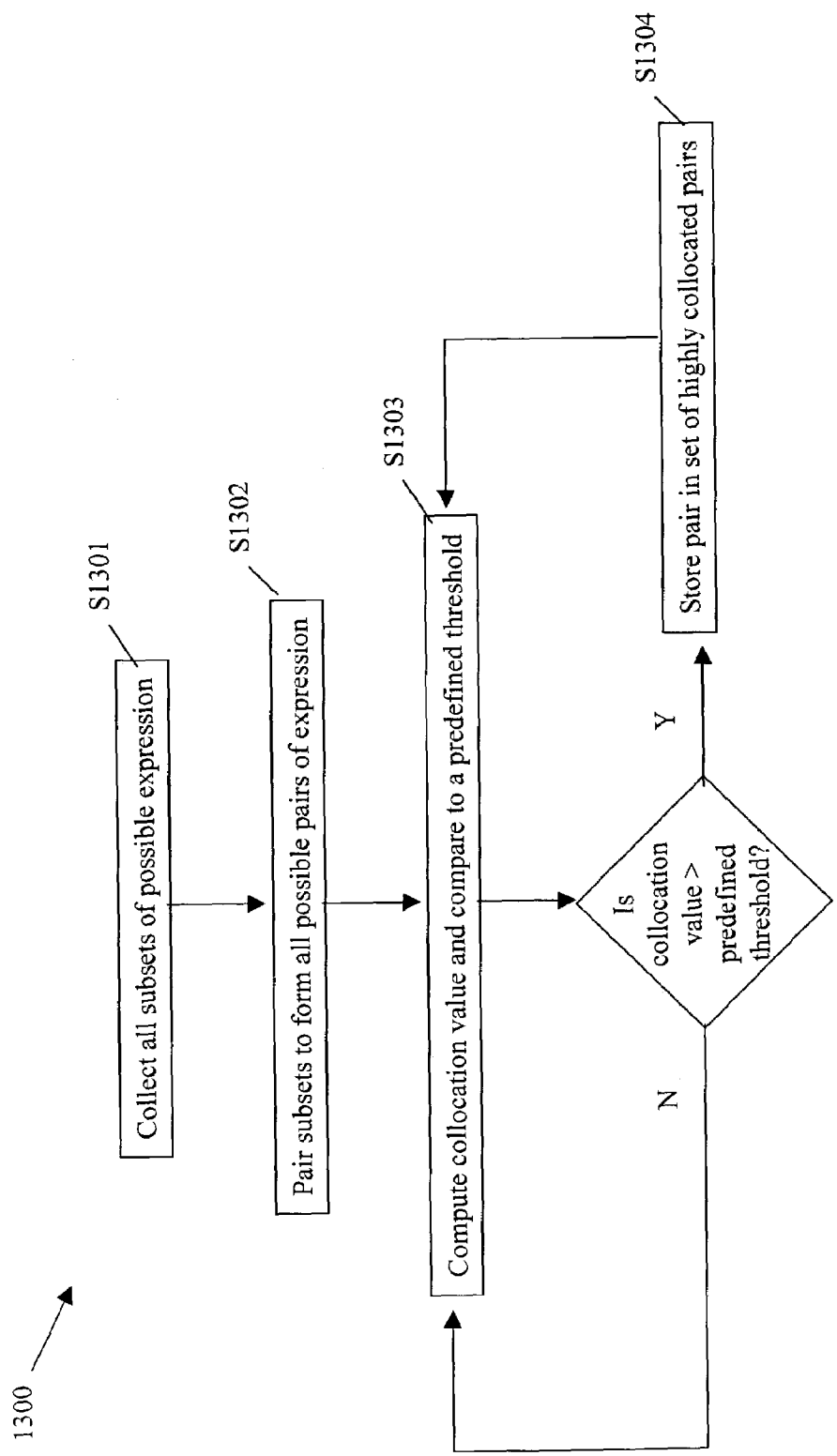
FIG. 13 shows an exemplary method for generating collocation statistics.

FIG. 13 shows an exemplary method 1300 for generating collocation statistics. In step S1301, all subsets of possible expression are collected. These subsets may include, for example, expressions that start with a sentence-begin tag and terminate with a sentence-end tag and include any combination of elements from the set of all expressions of wh-types (including, for example, all wh-nouns, wh-verbs, and wh-sentences), the set of all expressions of time, the set of all expressions of location, the set of all auxiliary verbs, the set of all conjunctions, the set of all verbs in the new domain, the set of all nouns in the new domain, and the set of all adjectives in the new domain. In step S1302, each instance of a subset of possible expression is paired with every other instance of the subset to form all possible pairs of expression. Instep S1303, a collocation value for each instance of the pairs of possible expression is computed and then compared to a predefined threshold. If the computed collocation value exceeds the threshold, then in step S1304, the particular pair instance is stored in the set of highly-collocated pairs.

Figure 14:
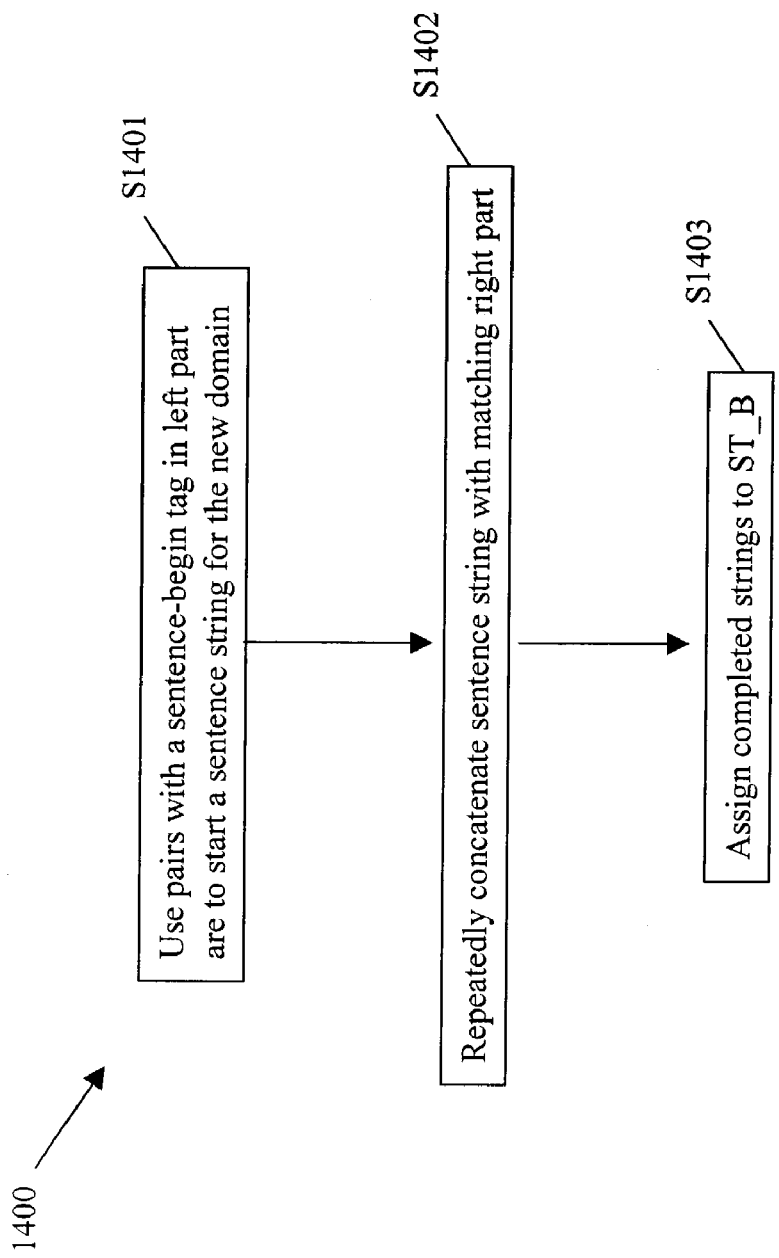
FIG. 14 shows an exemplary method for concatenating expression.

FIG. 14 shows an exemplary method 1400 for concatenating expression, in particular, for concatenating a set of highly-collocated pairs into synthesized sentences for the new domain. In step S1401, all pairs of expression stored in the set of highly-collated pairs which include a sentence-begin tag at the first position of the pair (i.e., the left part of the pair) are to start a sentence string for the new domain. In step S1402, each sentence string is repeatedly concatenated with a pair whose right part matches the left-most part of the sentence string until a sentence-end tag is encountered to complete the sentence string. In step S1403, the completed sentence strings are assigned to the set of tagged sentences for the new domain ST_B. The exemplary method 1400 to build synthesized sentences from the highly-collocated pairs of expression may be implemented in a recursive manner.

Exemplary Concatenation pseudo code is as follows:

```
Exemplary Concatenator Pseudo Code:
Concatenation Algorithm:
1. collect all the subsets in collection C = {
       wh-types (wh-nouns, wh-verbs, wh-sentences)
       time, dates, location, aux-verbs, conjunctions,
       verbs-in-domain-B,
       nouns-in-domain-B,
       adj-in-domain-B,
       adv-in-domain-B }
       with {sentence-begin} as the start symbol
       and {sentence-end} as the end symbol
2. for each pair of subsets (A B) from collection C do
       for each pair (a b) from (A B) do
           compute the collocation value cv of (a b)
           if cV(a b) > threshold then
               store (a b; A B) in satisfiedSet
3. Starting from sentence-begin,
    a. l = sentence-begin; L = (l); ST_B = { }
    b. take all the pairs P = {(l *)} from satisfiedSet
    c. ST_B = P;
    d. flag = 0; S' = 0;
    e. for all r such that (L r) is in ST_B
           if r is not sentence-end do
               take all the pairs P = {(r *)} from satisfiedSet
               S' = S' U {(L r *)}
           flag = 1;
    f. ST_B = S';
    g. if flag == 0 or |ST_B| > number-of-needed-sentences
           then output ST_B
           else go to d)
```

Notice: All the synthesized candidates stop at the sentence-end

Figure 15:
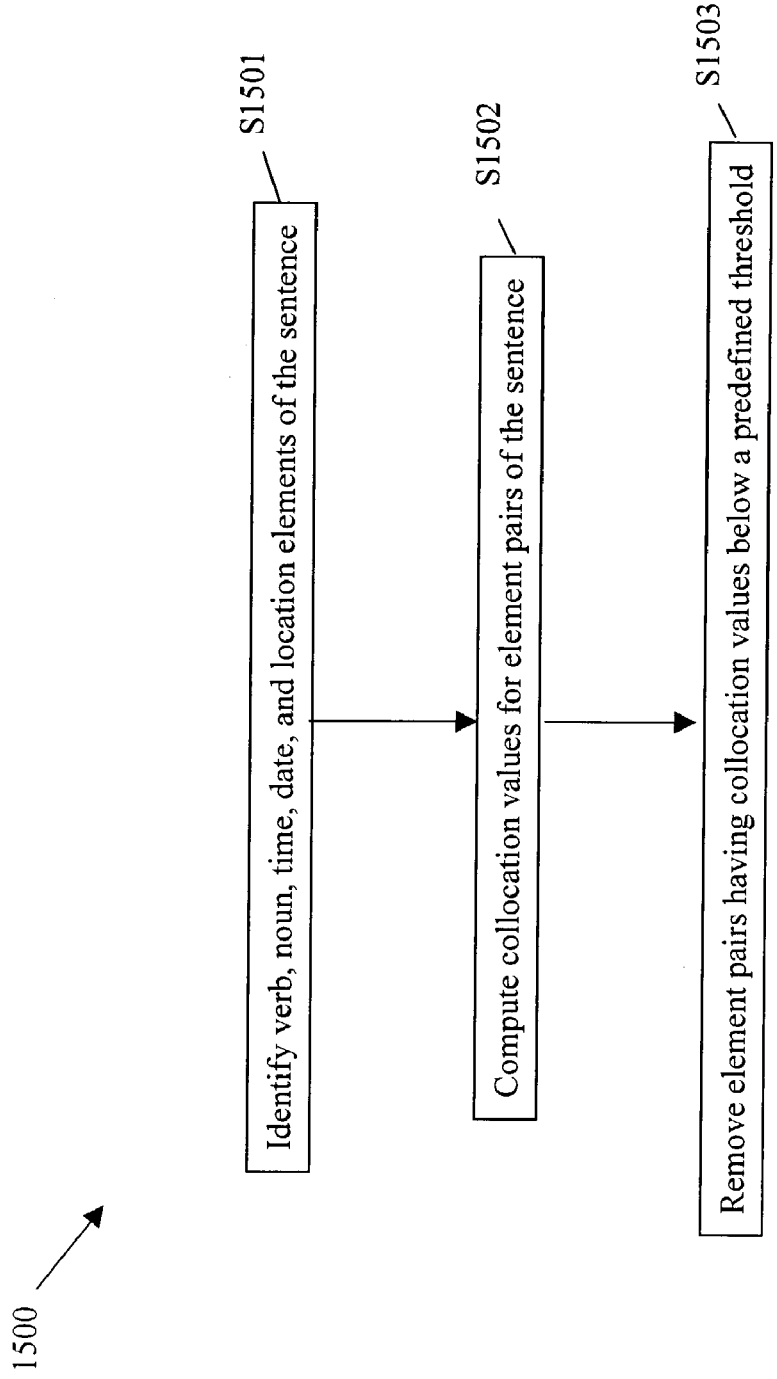
FIG. 15 shows an exemplary method to filter expression.

FIG. 15 shows an exemplary method 1500 to filter expression. In step S1501, each synthesized sentence is examined to identify the verb, noun, time, date, and location elements if they exist. In step S1502, the collocation values for are computed for the elements. For example, collocation values are computed for collocated verb/noun, verb/time, verb/date, verb/location, noun/time, noun/date, and noun/location element pairs of the sentence. In step S1503, the collocated element pairs having a computed collocation value below a predefined value are removed.

Exemplary Filter pseudo code is as follows:

```
Exemplary Filter Pseudo Code:
let verb be a verb in domain B, but not in TIME, DATE, and
LOCATION
let noun be a noun in domain B, but not in TIME, DATE, and
LOCATION
1) for all the synthesized sequences in ST_B do
       identify the verb, noun, time, date, and location categories if any
       compute the collocation values for:
           (verb, noun)
           (verb, time)
           (verb, date)
           (verb, location)
```

-continued

```
    (noun, time), if there is no verb or other noun between noun
    and time
    (noun, date), if there is no verb or other noun between noun
    and date
    (noun, location)
        if there is no verb or other noun between noun and location
    if one of them is below a threshold then remove this candidate
    from ST_B
B) Generate sentences from ST_B
```

What is claimed is:

1. A system for generating language modeling data for a speech recognition system, comprising:
   an expression extractor to extract expression from domain-specific data of an existing domain using a base of linguistic knowledge;
   a concept structure mapper to map extracted expression to expression in a new domain using vocabulary for the new domain;
   a concatenation module to concatenate extracted expression with domain-general data; and
   a filter arrangement to identify and filter out unrealistic expression in at least one of mapped and concatenated expression.

2. The system of claim 1, wherein the system is configured to generate the language modeling data without a pre-existing domain-specific grammar.

3. The system of claim 1, wherein the extracted expression includes a domain-invariant expression.

4. The system of claim 1, wherein the extracted expression includes at least one of an idiomatic, a temporal, a spatial, and a monetary expression.

5. The system of claim 1, wherein the extracted expression includes combined temporal and spatial expression.

6. The system of claim 1, wherein the base of linguistic knowledge includes a lexical reference source.

7. The system of claim 6, wherein the lexical reference source includes a dictionary.

8. The system of claim 7, wherein the dictionary includes an electronic dictionary.

9. The system of claim 8, wherein the electronic dictionary is available via a data network.

10. The system of claim 9, wherein the data network includes an Internet.

11. The system of claim 1, wherein the concept structure mapper includes a domain-specific word-pair mapping table to correlate at least one word in the existing domain with at least one word in the new domain.

12. A method for generating language modeling data for a speech recognition system, comprising:
    extracting expression from domain-specific data for an existing domain using a base of linguistic knowledge;
    mapping an extracted expression to an expression in a new domain using vocabulary for the new domain and a concept mapping table;
    concatenating the extracted expression using domain-general data; and
    filtering at least one of the mapped and concatenated expression.

13. The method of claim 12, wherein the step of mapping the extracted expression includes establishing a domain-specific word-pair mapping table to identify and correlate at least one word in the existing domain with at least one word in the new domain.

14. The method of claim 12, wherein the new domain includes at least one of a navigation system, a hotel information system, and a restaurant information system.

15. The method of claim 14, wherein the navigation system includes an automotive navigation system.

16. The method of claim 14, wherein the navigation system includes a hand-held device.

17. The method of claim 16, wherein the hand-held device includes a mobile telephone.

18. A method for generating language modeling data for a speech recognition system, comprising:
    extracting expression from domain-specific data for an existing domain using a base of linguistic knowledge;
    mapping an extracted expression to a expression in a new domain using vocabulary for the new domain;
    concatenating the extracted expression using domain-general data; and filtering at least one of the mapped and concatenated expression,
    wherein the step of mapping the extracted expression includes performing a neighboring word collocation verification test on the mapped expression to verify a naturalness of the mapped expression.

19. A method for generating language modeling data for a speech recognition system, comprising:
    extracting expression from domain-specific data for an existing domain using a base of linguistic knowledge;
    mapping an extracted expression to a expression in a new domain using vocabulary for the new domain;
    concatenating the extracted expression using domain-general data; and filtering at least one of the mapped and concatenated expression,
    wherein the step of concatenating includes performing a statistical collocation measurement of the concatenated expression to ensure a smoothness of at least one of neighboring words and neighboring phrases and chaining highly-collocated pairs to form candidate sentences for the new domain.

20. The method of claim 19, wherein the step of filtering includes performing an additional statistical collocation measurement of the candidate sentences and removing candidate sentences having a collocation value below a predefined value.

21. A storage medium having a set of instructions residing therein, the set of instructions being executable by a processor to implement a method for performing:
    extracting expression from domain-specific data for an existing domain using a base of linguistic knowledge;
    mapping an extracted expression to an expression in a new domain using vocabulary for the new domain and a concept mapping table;
    concatenating the extracted expression using domain-general data; and
    filtering at least one of the mapped and concatenated expression.

22. The storage medium of claim 21, wherein the step of mapping the extracted expression includes establishing a domain-specific word-pair mapping table to identify and correlate at least one word in the existing domain with at least one word in the new domain.

23. The storage medium of claim 21, wherein the new domain includes at least one of a navigation system, a hotel information system, and a restaurant information system.

24. The storage medium of claim 23, wherein the navigation system includes an automotive navigation system.

25. The storage medium of claim 23, wherein the navigation system includes a hand-held device.

26. The storage medium of claim 25, wherein the hand-held device includes a mobile telephone.

27. A storage medium having a set of instructions residing therein, the set of instructions being executable by a processor to implement a method for performing:

extracting expression from domain-specific data for an existing domain using a base of linguistic knowledge;

mapping an extracted expression to a expression in a new domain using vocabulary for the new domain;

concatenating the extracted expression using domain-general data; and filtering at least one of the mapped and concatenated expression, wherein the step of mapping the extracted expression includes performing a neighboring word collocation verification test on the mapped expression to verify a naturalness of the mapped expression.

28. A storage medium having a set of instructions residing therein, the set of instructions being executable by a processor to implement a method for performing:

extracting expression from domain-specific data for an existing domain using a base of linguistic knowledge;

mapping an extracted expression to a expression in a new domain using vocabulary for the new domain;

concatenating the extracted expression using domain-general data; and filtering at least one of the mapped and concatenated expression, wherein the step of concatenating includes performing a statistical collocation measurement of the concatenated expression to ensure a smoothness of at least one of neighboring words and neighboring phrases and chaining highly-collocated pairs to form candidate sentences for the new domain.

29. The storage medium of claim 28, wherein the step of filtering includes performing an additional statistical collocation measurement of the candidate sentences and removing candidate sentences having a collocation value below a predefined value.

* * * * *